(12) United States Patent
Johnson et al.

(10) Patent No.: US 8,370,826 B2
(45) Date of Patent: Feb. 5, 2013

(54) AUTOMATICALLY MANAGING VERSIONING OF MASHUP WIDGETS

(75) Inventors: David P. Johnson, Cary, NC (US); Kimberly D. Kenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 12/146,136

(22) Filed: Jun. 25, 2008

(65) Prior Publication Data
US 2009/0328025 A1 Dec. 31, 2009

(51) Int. Cl.
*G06F 9/44* (2006.01)
(52) U.S. Cl. .......................................... 717/168; 709/220
(58) Field of Classification Search .................... 717/170
See application file for complete search history.

(56) References Cited

U.S. PATENT DOCUMENTS

| | | | | |
|---|---|---|---|---|
| 6,490,597 B1 * | 12/2002 | Singh et al. ............................ | 1/1 |
| 7,356,679 B1 * | 4/2008 | Le et al. ............................ | 713/1 |
| 7,380,003 B1 * | 5/2008 | Guo et al. ...................... | 709/226 |
| 2004/0181790 A1 * | 9/2004 | Herrick .......................... | 717/168 |
| 2005/0065966 A1 * | 3/2005 | Diab .............................. | 707/102 |
| 2006/0200761 A1 * | 9/2006 | Judd et al. ...................... | 715/517 |
| 2006/0248189 A1 * | 11/2006 | Jerrard-Dunne et al. ..... | 709/225 |
| 2008/0172632 A1 * | 7/2008 | Stambaugh .................... | 715/781 |
| 2009/0128844 A1 * | 5/2009 | Kondo et al. ................. | 358/1.15 |
| 2010/0138295 A1 * | 6/2010 | Caron et al. ............... | 705/14.49 |

* cited by examiner

*Primary Examiner* — Li B Zhen
*Assistant Examiner* — Joanne Macasiano
(74) *Attorney, Agent, or Firm* — Patents on Demand P.A.; Brian K. Buchheit; Scott M. Garrett

(57) ABSTRACT

A request for a mashup widget having multiple versions from an identifiable source can be identified. A data store can be queried to determine if a previous request for the mashup widget was made by the identifiable source. When the previous request exists, a version of the mashup widget used to handle the previous request can be automatically determined. The determined version can be one of many versions of the mashup widget. The determined version of the mashup widget can be used to generate a response to the request. When the previous request is not found when querying the data store, one of the mashup versions that is to be used can be determined based upon a programmatic rule. Historical data regarding widget version use can be saved in the data store and used to determine which widget version is to be selected to handle future requests.

16 Claims, 3 Drawing Sheets

AUTOMATICALLY MANAGING VERSIONING OF MASHUP WIDGETS

BACKGROUND OF THE INVENTION

The present invention relates to the field of software management, more particularly to automatically managing versioning of mashup widgets.

Mashup pages have become increasingly popular on the Web. A mashup page is a Web interface that combines data from more than one source into a single integrated interface. Many of these mashup pages employ the use of widgets to display content from different sources. Each widget controls the presentation characteristics of data from a given content generator (i.e., a URI addressable source). Interactions between widgets are provided through the use of eventing mechanisms.

Generally, users create a new mashup by starting with a blank Web page, placing content from one or more widgets within a design canvas associated with the blank page, and saving the page view. Communications with and among widgets are either automatically determined (some widgets can detect other "compatible" widgets and automatically communicate) or user specified through the design interface. A user can save a constructed mashup page and publish it to a server. Each time the mashup page is navigated to, the widgets can pull content from their respective sources and can communicate with each other through their eventing mechanisms. Mashups represent a powerful paradigm of customized Web page development, which is quick, leverages existing resources, and permits a user set having minimal software development knowledge to create robust, customized Web pages.

Widgets are constantly being updated and URI addressable content sources are constantly changing. Problems can arise if the widgets associated with a mashup are updated so as to be incompatible with other mashup elements, which include other widgets. Problems also arise when widgets are no longer linked appropriately to a content source (e.g., URI content changes, an updated widget points to a different content source, etc.). No current solution exists that resolves widget versioning problems.

DETAILED DESCRIPTION OF THE INVENTION

Figure 1:
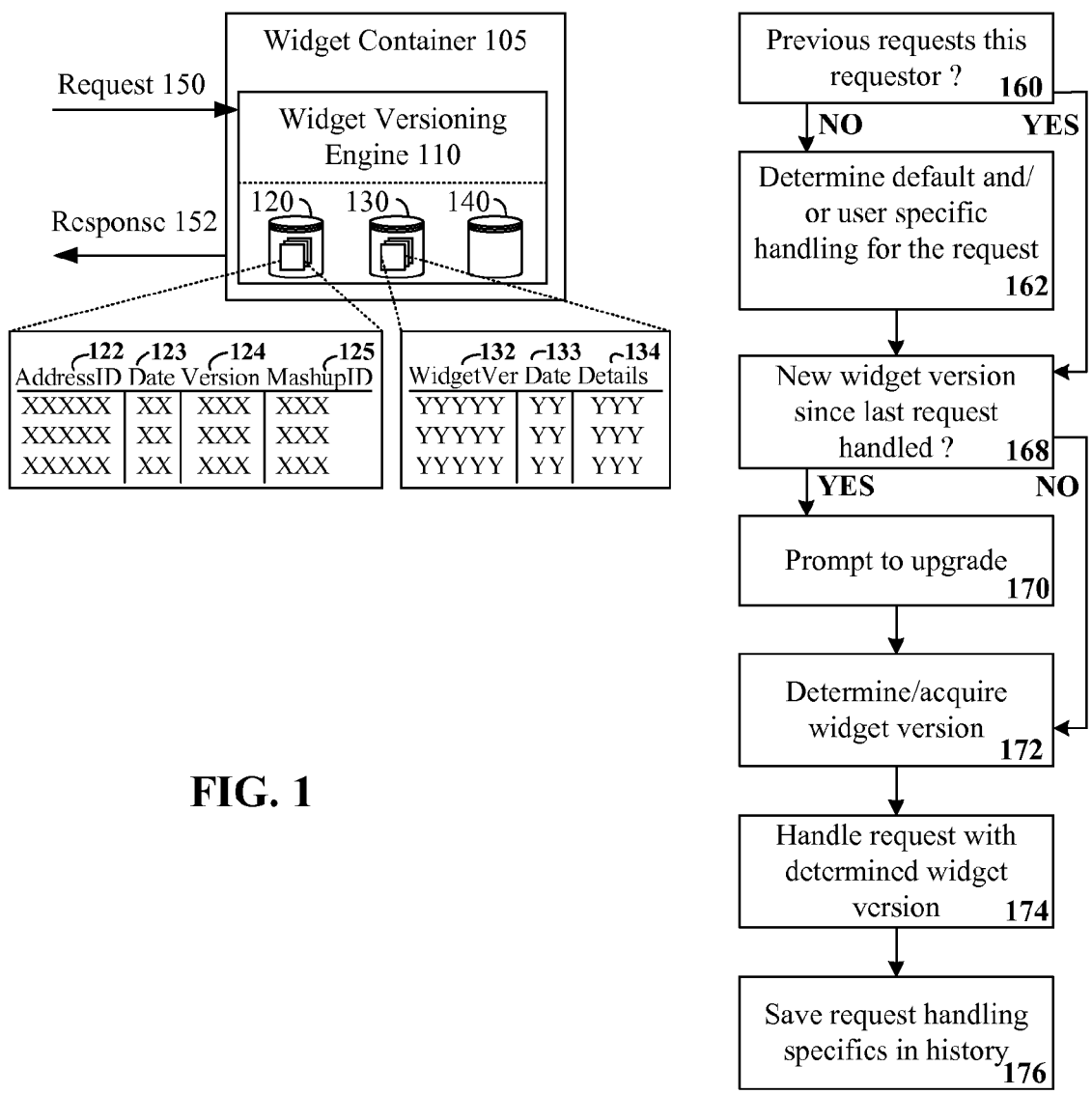
FIG. 1 is a schematic diagram showing a widget version manager able to automatically manage mashup widget versions in accordance with an embodiment of the inventive arrangements disclosed herein.

The present invention can allow for the automatic management of mashup widget versions. Widgets can be embeddable chunks of code that can be instantiated and executed within any independent HTML-based Web page, such as a mashup. Mashups pull content from a URI addressable source and include an eventing mechanism to facilitate interactions with other mashup elements, which can include other widgets. The invention utilizes a widget version manager, which can be part of a widget container, to automatically manage versions of widgets. In one embodiment, the widget version manager can intercept request for widgets from Web pages and can return responses according to a store of information that the manager maintains.

For example, the widget version manager can maintain information for multiple versions of the widget. When a request is received by the widget version manager, the datastore can be checked to see if the widget has been previously requested from this address. If so, a last recorded version of the widget successfully used can be utilized to respond to the request. If the no previous use is recorded in the data store, the widget version manager can perform a default action, such as determining a most recent version of the widget and utilizing that widget version to handle the request. Another default action can be to prompt a user to select a version of the widget to be used. Still another default action can be to query a user's profile (assuming one is maintained) for user specific settings and select a widget to use based upon these settings. Additionally, when a widget has been upgraded between the current request and the last use of the widget by the user, the user can be notified of the widget version update and can be presented an option to upgrade to the new version or not.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram showing a widget version manager 110 able to automatically manage mashup widget versions in accordance with an embodiment of the inventive arrangements disclosed herein. The widget version manager 110 can be part of a widget container 105. The widget version manager 110 can access a request history data store 120, a version data store 130, and/or a user profile data store 140. An actual location of each data store 120-140 is irrelevant, so long as the widget version manager 110 has access to that data store.

The request history data store 120 can maintain records of widget use by requester and date. While any breath of logging requests can be accommodated, a most recent record/use by requester should at least be maintained in the data store 120. Each record of the request history data store 120 can include a requester identifier 122. Typically, a unique device address of the requesting device can be maintained in field 122, but other requester unique identifiers can also be used, such as a user identifier. A date of a request 123 can also be maintained, as can a version 124 of the widget associated with a request. In one embodiment, a mashup identifier 125 can also be maintained. The mashup identifier 125 can be used in situations where a common user (or requesting address) 122 uses the versioned widget for more than one mashup page and may desire to use different versions of the widget for different mashup pages.

The version data store 130 can include widget versioning information, such as a widget version identifier 132, a date 133 of release for that version, and version details 134. The version details 134 can specify changes for this version of the widget, known changes to a data source from which the widget pulls data, compatibility data with past versions, and the like. The user profile data store 140 can include request (i.e., user and/or requesting device) specific settings relating to widget version management.

The widget version manager 110 can intercept requests for a widget. It can then determine if previous requests have been made by this requester by querying the data store 120, as shown by step 160. If no previous request exists, user specific defaults, if any, can be determined by querying data store 140, as shown by step 162. If no user specific defaults exist, general defaults for determining a widget version can be utilized.

In step 168, a query can be made to data stores 120 and 130 to determine if a new widget version has been added since a last request by this requestor. If so, the user can be optionally prompted to upgrade, as shown by step 170. In step 172, a widget version can be determined/acquired. This widget version is the same version last used by a requester having a historic record for that widget saved in data store 120, unless an upgrade was opted for (step 170). The widget version determined by step 172 is a version specified by the user/specific or general defaults can be used in step 172. In step 174, the determined widget version can be used to handle the quest 150. In step 176, the request history data store 120 can be updated to reflect a current date 123, and widget version 124 used by the requester 122, which affects how version manager 110 handles future requests. The determined version of the widget is executed, which produces response 152 for the original request 150.

As used herein, a mashup can be a Web application (or Web page) that uses content from more than one source to create a completely new service. That is, a mashup is a software component that yields new utility by seamlessly combining content from two or more sources or disparate components with new behavior to form a new, integrated Web application. Content used in mashups can come from a third party via a public interface (API), an RSS or ATOM feed, screen scraping, and the like. Mashups use a set of source specific mashup widgets, one for each data source.

A mashup widget (one being shown by container 105) can be a software component used by a mashup assembler within a mashup maker to create a new mashup. Each mashup widget can be a portable chunk of code that can be installed and executed within any separate Hypertext Markup Language (HTML)-based Web page without requiring additional compilation. Mashup widgets can encapsulate disparate data, user interface markup, and user interface behavior into a single component that generates code fragments, such as Dynamic HTML (DHTML) fragments, JAVA SCRIPT fragments, etc. These code fragments are executable portions of a mashup page that pull data from a content source and that use an eventing mechanism to interact with other mashup-widget-created-fragments and mashup application elements.

The widget versioning engine 110 is a novel component not typically present in a mashup widget container 105. The functionality of the widget versioning engine 110, while able to be encapsulated within a widget container 105 is not limited to this specific implementation. In another embodiment, functionality of the widget versioning engine can be implemented in a widget independent component (in a software component not encapsulated in a widget container 105), which implements functionality approximately equivalent to that expressed for engine 110. For example, an external widget versioning engine can perform the process represented by steps 160-176.

Figure 2:
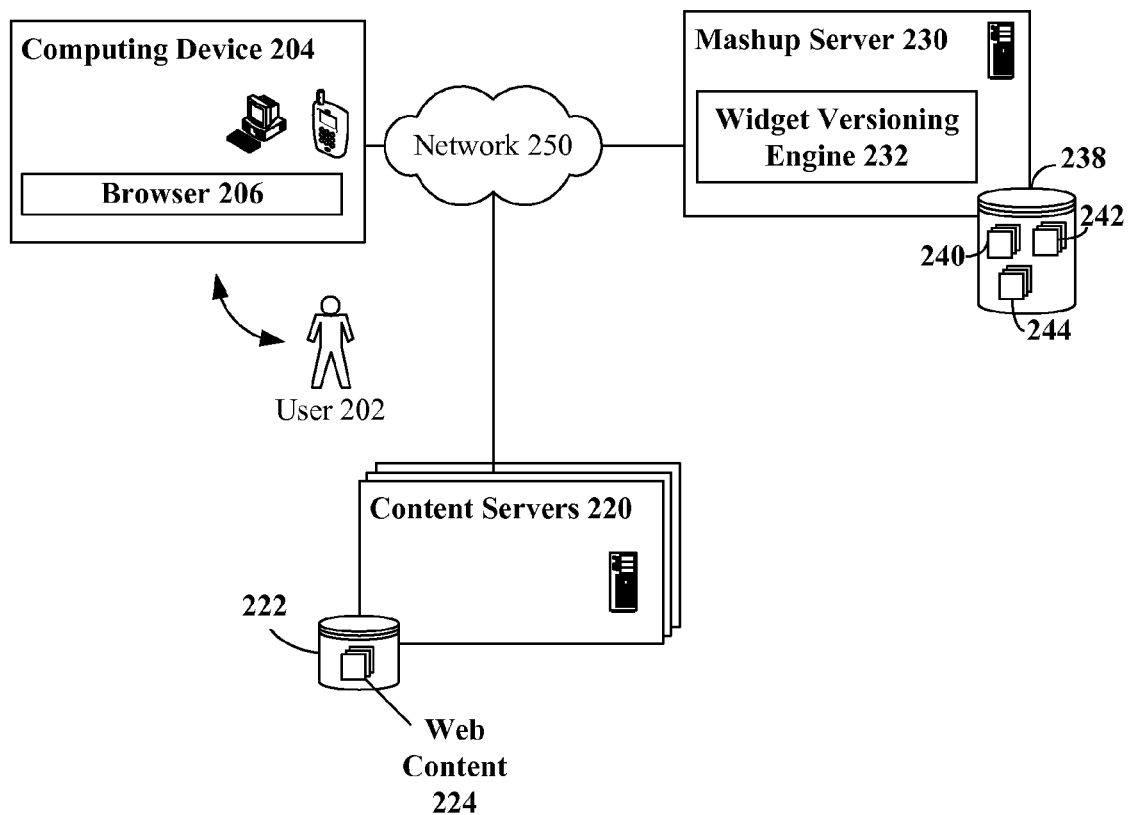
FIG. 2 is a schematic diagram of a system for managing widget versioning data to allow the safe and automatic upgrade of widget versions in accordance with an embodiment of the inventive arrangements disclosed herein.

FIG. 2 is a schematic diagram of a system 200 for managing widget versioning data to allow the safe and automatic upgrade of widget versions in accordance with an embodiment of the inventive arrangements disclosed herein. System 200 can be one implementation environment for the widget manager 110 shown in FIG. 1. Although system 200 shows a widget versioning engine 232 being implemented within mashup server 230, the functionality of engine 232 can alternatively be encapsulated within the widgets 240 as can the versioning data 242, as expressed in FIG. 1. System 200 purposefully expresses a different configuration to emphasize the implementation flexibility of the inventive arrangements disclosed herein.

In system 200, user 202 can use a computing device 204 having browser 206 to interact with mashup server 230 (or other content server depending upon a parent container of the widget) via network 250. The mashup server 230 can provide a mashup application to device 204 responsive to user 202 initiated requests. A mashup application can utilize a plurality of different widgets 240, each associated with a specific content source 220, which interact with each other using eventing mechanisms. Each widget 240 can pull Web content 224 from a data store 222 served from the associated content server 220.

Additionally, each widget 240 can have multiple versions, specifics of which can be specified in the versioning data 242.

The versioning data 242 can be encapsulated within each widget 240 (as can functionality of versioning engine 232) and/or can be maintained in a distinct software artifact and/or data store 238, which is accessible by the widget versioning engine 232. The widget versioning engine 232 can manage the widgets 240 and versioning data 242. Further, the versioning engine 232 can maintain a historical data 244 of how previous request for a given user 202 or device 204 were handled. The historical data 244 can be used to determine how a current request is to be handled. The historical data 244 can be updated whenever mashup widget versions are used.

For example, user 202 can convey a request for a mashup application to mashup server 230. The mashup application can include multiple widgets 240, at least a portion of which have multiple versions. Versioning engine 232 can determine an appropriate version of each widget 240 that is to be used. This decision by the versioning engine 232 can be based at least in part upon historical request information 244. It can be assumed that a requester 202 wants to utilize the same version of the widget 240 as last used in absence of significant changes. One such change can be an existence of a new version of the widget 240 since the last request by the user 202 was handled.

If no previous request by a given user 202/device 204 for the mashup containing the widget 240 exists, no historic versioning information 244 will be present in the data store 238. In this case, a programmatic algorithm can be used to determine a widget version. In one embodiment, the algorithm can select, by default, a most current widget version 240. In another embodiment, the algorithm can prompt a user 202 to select a widget version after being presented with an overview of the differences existent among the versions. User 202 configurable settings can be applied to the default algorithm to alter default widget version selection behavior.

As used herein, computing device 204 can be any computing device capable of interacting with mashup server 230 via an executable browser 206. The browser 206 can be any application capable of rendering a mashup application including, but not limited, to a Web browser, a Rich Internet Interface, a Web enabled desktop gadget, and the like. Computing device 204 can include, but is not limited to, a desktop computer, laptop computer, mobile phone, a navigation device, a Web appliance, game console, a kiosk, and/or the like.

Network 250 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 250 can include local components and data pathways necessary for communications to be exchanged among computing device components and between integrated device components and peripheral devices. The network 250 can also include network equipment, such as routers, data lines, hubs, and intermediary servers which together form a packet-based network, such as the Internet or an intranet. The network 250 can further include circuit-based communication components and mobile communication components, such as telephony switches, modems, cellular communication towers, and the like. The network 250 can include line based and/or wireless communication pathways.

Data stores 222 and 238 can be physically implemented within any type of hardware including, but not limited to, a magnetic disk, an optical disk, a semiconductor memory, a digitally encoded plastic memory, a holographic memory, or any other recording medium. The data stores 222 and 238 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Figure 3:
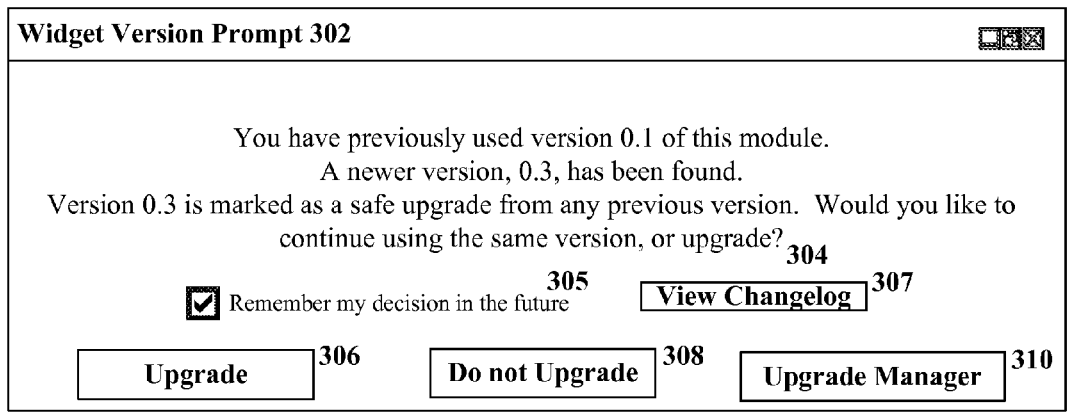
FIG. 3 illustrates interfaces for managing versioning data of mashup widgets in accordance with an embodiment of the inventive arrangements disclosed herein.
Figure 3:
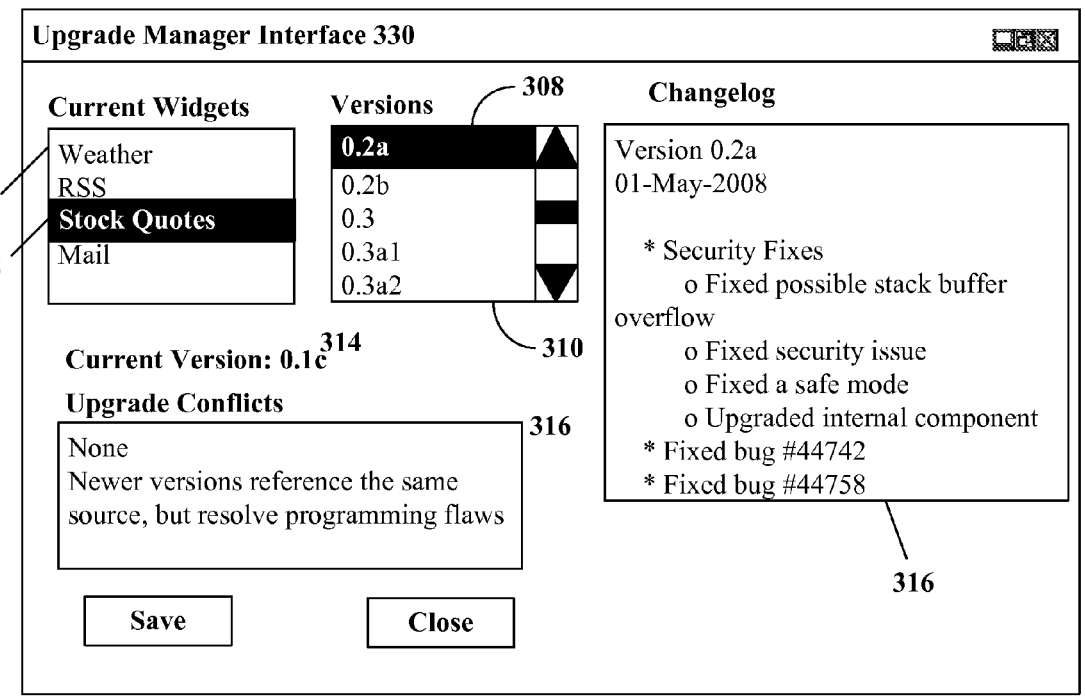

FIG. 3 illustrates interfaces 302, 330 for managing versioning data of mashup widgets in accordance with an embodiment of the inventive arrangements disclosed herein. One of the interfaces 302 is a widget version prompt, which can be an interface that prompts a user when a newer version widget has been found. Interface 302 can be automatically presented when a mashup widget has been upgraded since last use. Interface 330 can be presented to a user to establish a mashup widget versions when no historic data indicating a widget version preference for a given user exists. The interface 330 can also be used at any time to alter widget version use preferences.

As shown, prompt interface 302 can include text 304, which can notify the user that they currently use an older version of the requested widget and a newer version has been found. Text 304 can also include compatibility information regarding the upgrade (i.e. any known incompatibilities or upgrade notes). Prompt 302 can also include checkbox 305, which can allow a user to enable the saving of the user's selection. For example, if checkbox 305 is enabled and the user chooses to upgrade the widget, the next time the user would be prompted for an upgrade and the same compatibility situation is encountered, their decision can automatically be applied.

In the illustrated example, prompt 302 states that the upgrade is marked as safe and there are no known incompatibilities. Therefore, if checkbox 305 is enabled and the user selects upgrade 306, future possible widget upgrades in which are marked as safe can automatically be upgraded. Button 307 can allow a user to view the change log for the version prompt 302 is requesting to upgrade to. A change log can be a document which contains the differences between different versions of an application. Upgrade 306 can be a button in which can enable the upgrading of the widget to the newer version. Do not upgrade 308 can be a button in which can disable the upgrading of the widget to the newer version. Upgrade manager 310 can be a button in which can spawn an interface such as upgrade manager interface 330.

Upgrade manager interface 330 can allow a user to select the version widget to use for each widget they're currently using. Listbox control 304 can be a list of the current widgets the user has on their mashup page. Selection 306 can illustrate that the user has selected the stock quotes widget. Listbox control 310 can be a list of the versions for the widget selected in selection 306. Selection 308 can illustrate that the user has selected version 0.2a of the stock quotes widget. Change log 316 can illustrate a preview of the changes for the selected version of the currently selected widget. Text 314 can illustrate the current version of the widget that the user is running. Upgrade conflicts 316 can list known compatibilities or differences in the currently selected widget version.

The interfaces 302, 330 are presented for illustrative purposes only and the invention is not to be construed as limited in this regard. That is, the user interface elements shown can be adjusted to be consistent with an interface of a given application, browser, operating system, and/or computing device. Further, toolbars, menu selection elements, pop-ups, and the like can be utilized in place of the user interface controls shown. Additionally, although shown as graphical user interface (GUI) controls, the interfaces 302, 330 can be adjusted to be implemented in a voice user interface (VUI), a text user interface (TUI), a multimodal interface, and the like.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically managing mashup widget versions comprising:
    identifying a request for a mashup widget having a plurality of versions from an identifiable source;
    querying a data store to determine if a previous request for said mashup widget was made by the identifiable source;
    during the querying after determining a version was used to handle a previous request, determining a last used date that the version was last used by the identifiable source;
    when said previous request is not found when querying the data store:
        (a) determining one of the mashup versions to be utilized based upon a programmatic rule;
        (b) querying a user profile to determine requestor specific settings affecting the programmatic rule; and (c) applying these requestor specific settings when executing the programmatic rule;

when said previous request exists:

(a) automatically determining a version of said mashup widget used to handle said previous request, wherein said determined version is one of the plurality of versions;

(b) comparing the determined data against a last update date associated with a most current one of the plurality of versions;

(c) when the last update date is more recent than the last used date, prompting whether to use the most current version or to use determined version to handle the request; and using said determined version to generate a response to said request.

2. The method of claim 1, wherein programmatic logic for performing said identifying, querying, determining, and using is part of a container of said mashup widget.

3. The method of claim 1, wherein said identifiable source is a unique network address of a computing device from which the request was issued.

4. The method of claim 1, wherein said programmatic rule determines a most current one of the plurality of versions is to be utilized.

5. The method of claim 1, further comprising

Saving the mashup version used to generate the response to said request in the queried data store so that said saved mashup version will be used to handle future requests by the identifiable source.

6. A computer program product for automatically managing mashup widget versions comprising:

a non-transitory computer usable medium having computer usable program code embodied therewith, the non-transitory computer usable program code comprising:

computer usable program code configured to identify a request for a mashup widget having a plurality of versions from an identifiable source;

computer usable program code configured to query a data store to determine if a previous request for said mashup widget was made by the identifiable source;

computer usable program code configured to automatically determine a version of said mashup widget used to handle said previous request, wherein said determined version is one of the plurality of versions when said previous request exists;

computer usable program code configured to determine one of the mashup versions to be utilized in the using step based upon a programmatic rule when said previous request is not found when querying the data store, wherein the programmatic rule determines a most current one of the plurality of versions is to be utilized;

computer usable program code configured to use said determined version to generate a response to said request;

computer usable program code configured to query a user profile to determine requestor specific settings affecting the programmatic rule; and computer usable program code configured to apply these requestor specific settings when executing the programmatic rule.

7. The computer program product of claim 6, wherein programmatic logic for performing said identifying, querying, determining, and using is part of a container of said mashup widget.

8. The computer program product of claim 6, wherein said identifiable source is a unique network address of a computing device from which the request was issued.

9. The computer program product of claim 6, further comprising:

computer usable program code configured to determine a last used date that the version was last used by the identifiable source during the querying after determining a version was used to handle a previous request;

computer usable program code configured to compare the determined data against a last update date associated with a most current one of the plurality of versions; and computer usable program code configured to prompt whether to use the most current version or to use determined version to handle the request when the last update date is more recent than the last used date.

10. The computer program product of claim 6, further comprising computer usable program code configured to save the mashup version used to generate the response to said request in the queried data store so that said saved mashup version will be used to handle future requests by the identifiable source.

11. A method comprising:

identifying a request for a mashup widget from an identifiable source, wherein a widget container includes a widget version manager that manages multiple versions of the mashup widget, wherein the widget version manager maintains information for a plurality of different versions of the mashup widget and maintains per user usage records of these different versions of the mashup widget;

the widget version manager querying a data store to determine if a previous request for said mashup widget was made by the identifiable source;

when said previous request exists that indicates that one of the versions of the mashup widget was successfully used by the identifiable source:

a) the widget version manager checking to see when a version of the widget was last updated;

a. when the checking indicates the mashup widget has been upgraded between a time of the request and the previous request, notifying a requestor of a widget version update and presenting an option to the requestor to upgrade to a latest version of the widget or not;

b) when the checking indicates the mashup widget has not been upgraded between a time of the request and the previous request, providing the requestor with the version of the mashup widget corresponding to the previous request;

when no previous request exists that indicates that one of the versions of the mashup widget was successfully used by the identifiable source, the widget version manager determining one of the plurality of different versions of the mashup widget to be utilized based upon a programmatic rule, said widget version manager further querying a user profile to determine requestor specific settings affecting the programmatic rule and applying these requestor specific settings when executing the programmatic rule, and the widget version manager providing the determined version of the mashup widget in response to the request.

12. The method of claim 11, wherein the widget version manager is encapsulated within the mashup widget, as is versioning data for the different versions of the mashup widget.

13. The method of claim 11, further comprising:

presenting a user interface to a user for managing versioning data of mashup widgets.

14. The method of claim 13, wherein the presented user interface provides an indication of whether a specific upgrade version of the mashup widget is safe along with any known incompatibilities.

15. The method of claim 13, wherein the presented user interface provides a user option able to be enabled or disabled, wherein when enabled, the user option causes the widget version manager to automatically upgrade a version of the mashup widget that are marked as safe.

16. The method of claim 13, wherein the presented user interface comprises:

a list of versions of the mashup widget that a user is able to select for use;

a change log that illustrates a set of changes for one of the versions of the mashup widget; and a conflict upgrade providing a list of compatibilities or differences among the versions of the mashup widget.

* * * * *